May 28, 1968  W. C. KIRCHBERGER ET AL  3,385,151
PIERCING PUNCH APPARATUS
Filed Oct. 24, 1965  2 Sheets-Sheet 1
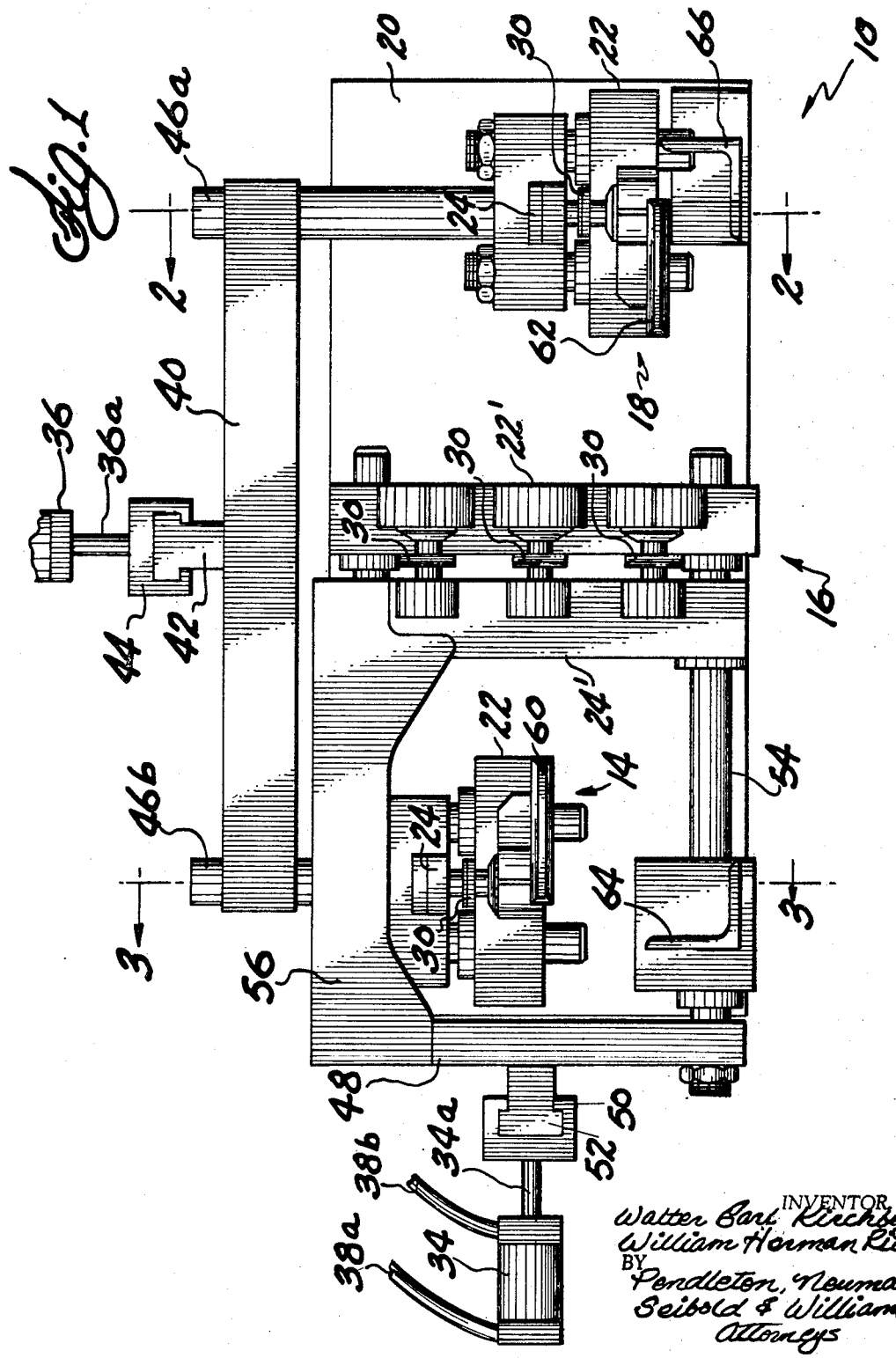
INVENTOR.
Walter Carl Kirchberger
William Horman Rietz
BY Pendleton, Neuman
Seibold & Williams
Attorneys May 28, 1968 W. C. KIRCHBERGER ET AL 3,385,151

PIERCING PUNCH APPARATUS

Filed Oct. 24, 1965 2 Sheets-Sheet 2

INVENTOR.
Walter Carl Kirchberger
William Herman Stetz
BY Pendleton, Neuman,
Seibold & Williams
Attorneys

United States Patent Office 3,385,151
Patented May 28, 1968

3,385,151
PIERCING PUNCH APPARATUS
Walter Carl Kirchberger and William Herman Rietz, Menomonee Falls, Wis., assignors to Globe-Union Inc., Milwaukee, Wis., a corporation of Delaware
Filed Oct. 24, 1965, Ser. No. 504,661
5 Claims. (Cl. 83—513)

ABSTRACT OF THE DISCLOSURE

A piercing punch apparatus for forming openings in transversely disposed partitions of battery casings to facilitate intercell welding. Means is provided to properly align the casings relative to the punch apparatus.

The present invention relates generally to piercing punch apparatus and, more specifically, to such apparatus for forming openings in transversely disposed walls or partitions of battery casings or the like to facilitate intercell welding. Moreover, the present invention relates to an improvement of the apparatus disclosed in the copending application of Richard A. Buttke and William H. Behrens, Ser. No. 303,855, filed Aug. 22, 1963, now Patent No. 3,328,829, which is assigned to the assignee of this application.

In various storage battery manufacturing operations, a plurality of openings must be formed in transversely disposed partitions or walls of battery casings through which internal cell connections are to be formed. In present apparatus for forming openings in transverse directions, such as the apparatus disclosed in the above-identified copending application, openings are formed in one direction at a first station and are formed in the transverse direction at a second station. In order to reduce manufacturing costs of such storage batteries, it has been desirable to provide apparatus for forming openings in transversely disposed walls or partitions of battery casings at a single station.

A primary object of the present invention is to provide new and improved piercing punch apparatus. More specifically, it is an object to provide new and improved apparatus for forming openings in transversely disposed walls or partitions of battery casings or the like. In this latter connection, it is an object to provide apparatus which facilitates the formation of intercell connections. Moreover, it is an object to provide such apparatus for forming openings in transverse directions at a single station.

A further object of the present invention is to provide such apparatus for accurately forming intercell connection openings in partitions or walls of battery casings which apparatus is not limited to use with any one particular type of battery construction.

Another object of the present invention is to provide such apparatus which may be readily modified for the formation of different size openings.

A general object of the present invention is to provide new and improved piercing punch apparatus for forming openings in transversely disposed walls or partitions of battery casings or the like characterized in its simplicity, economy and ease of operation.

Other objects and advantages of the invention will become apparent upon reading the attached detailed description, taken in conjunction with the drawings.

In one form of the present invention, apparatus is provided for forming openings in transversely disposed walls or partitions of battery casings or the like at a single station which includes support means, means positioned on the support means which are operable to form a desired number of openings in walls disposed in a first direction, means positioned on the support means which are operable to form a desired number of openings in walls disposed in a transverse direction, and means operable to render the opening forming means operative.

For the purpose of providing a detailed description of piercing punch apparatus constructed in accordance with the teachings of the present invention, reference will now be made to the drawings wherein:

FIG. 1 is a top plan view of piercing punch apparatus constructed in accordance with the teachings of the present invention;

While the invention has been shown and will be described in some detail with reference to a particular exemplary embodiment thereof, there is no intention that it be limited to such detail. Quite to the contrary it is intended here to embrace all modifications, alternatives and equivalents falling within the spirit and scope of the invention defined by the appended claims. In this connection, the invention will be described in conjunction with the formation of openings in the walls of battery casings. However, it will be apparent that this is merely illustrative of one use of the apparatus.

Figure 4:
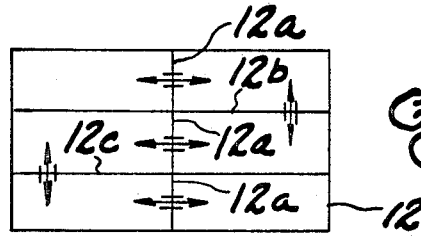
FIG. 4 illustrates the openings which will be formed in the walls or partitions of a battery casing or the like with the apparatus shown in FIGS. 1–3.
Figure 2:
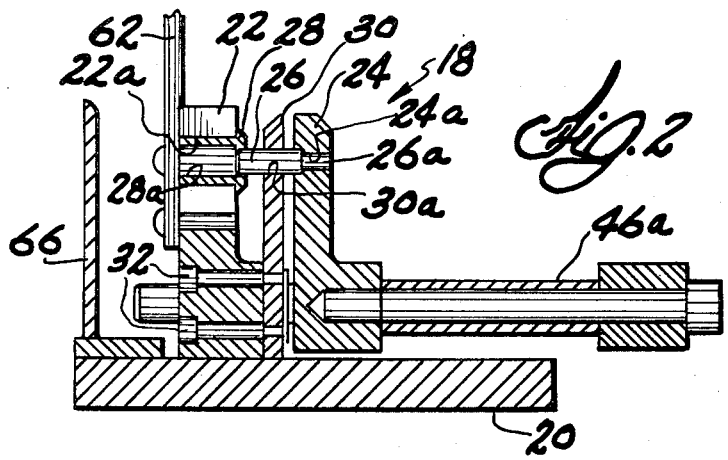
FIG. 2 is a view taken substantially along line 2—2 in FIG. 1.
Figure 3:
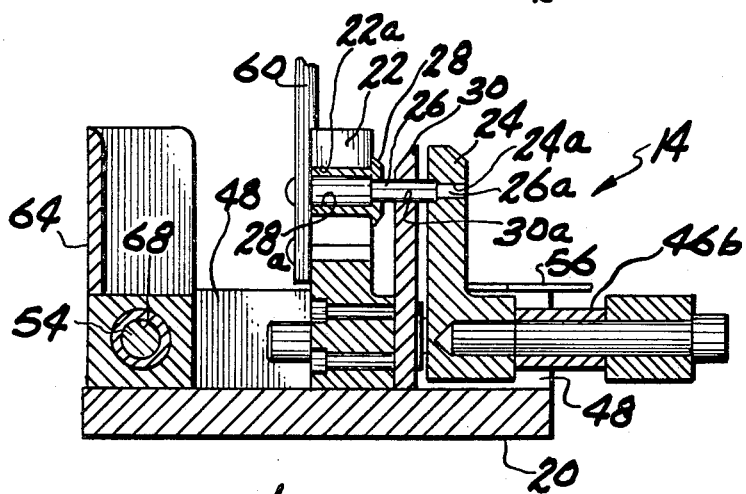
FIG. 3 is a view taken substantially along line 3—3 in FIG. 1.

Referring now to the drawings and more specifically to FIGS. 1–3, piercing punch apparatus 10 constructed in accordance with the teachings of the present invention is shown. Since the present invention resides in the provision of punching apparatus for forming openings in transversely disposed walls or partitions of a battery casing or the like at a single station, the details of the supporting apparatus therefor and the punch driving means have not been shown and will not be discussed. However, reference may be made to the copending application Ser. No. 303,855 for the details of typical supporting apparatus and punch drive means. The exemplary apparatus 10 is designed to form openings in the walls of a battery casing or the like having walls disposed as shown in FIG. 4. More specifically, the exemplary apparatus is designed to form three openings in aligned walls or partitions 12a of a battery casing or the like and to form one opening each in transversely disposed walls or partitions 12b and 12c of the battery casing or the like. For this purpose, the exemplary apparatus includes piercing punch devices 14, 16 and 18, wherein each of the devices 14 and 18 is designed to form a single opening in the respective walls 12c and 12b and the device 16 is designed to form a single opening in each of the walls 12a. The punching devices 14, 16 and 18 are mounted on a common support plate 20 which in turn may be mounted on suitable supporting apparatus.

Referring to FIGS. 2 and 3 respectively, the details of the piercing punch devices 18 and 14 are shown. Since these devices are substantially identical, only the details of the device 18 will be discussed and the components of the device 14 will be given the same numbers. The piercing punch device 18 includes a die holder 22 and a punch holder 24. The punch holder 24 is mounted in spaced relationship with the die holder 22 for movement toward and away from the die holder along the support plate 20 to respective punching and spaced positions. For the purpose of performing a punching operation responsive to movement of the punch holder 24 into punching relationship with the die holder 22, a selected shear punch 26 is suitably mounted on the punch holder which is aligned with and cooperates in a conventional manner with a selected die 28 suitably mounted on the die plate. The punch 26 may, for example, have a threaded portion 26a which is threaded into a threaded aperture 24a in the punch holder 24 so that the punch is secured thereto, and the punch preferably has a tool steel cutting tip. On the other hand, the die 28 may, for example, be received in an aperture 22a in the die plate and may be suitably secured thereto such as by a set screw. Thus, various size punches and dies may be interchanged in the device 18. As may be seen, the die 28 has an aperture 28a formed therein which is aligned with and is adapted to receive the punch 26 during a punching operation.

For the purpose of limiting movement of the punch holder 24 toward the die holder 22 to establish the punching position therebetween and for the purpose of freeing a pierced article from the punch 26 when the punch holder 24 is being moved away from the die holder 22 into spaced relationship therewith subsequent to a punching operation, a stripper member 30 may be disposed between the punch holder and the die holder. The stripper member functions to hold a pierced article in place as the punch 26 is being extracted from the hole formed therein. In the exemplary arrangement, the stripper member 30 is suitably mounted on and secured to the die holder 22 by screws or the like 32. As may be seen, an aperture 30a, which is aligned with the punch 26 and the die aperture 28a, is formed in the stripper member 30 to accommodate the punch 26 during a punching operation.

The details of the punch device 16 correspond to the details of the punch devices 18 and 14 shown in FIGS. 2 and 3, except for the fact that the punch device 16 includes three punching assemblies disposed in side-by-side relationship wherein a common punch holder 24′ carries three punches and a common die holder 22′ carries three dies.

In keeping with the present invention, suitable means are provided for moving the punch holders of the punch devices 14, 16 and 18 toward and away from the die holders to the respective punching and spaced positions. In the exemplary arrangement, a double-acting fluid cylinder 34 is provided for imparting such movement to the punch holder 24′ of the punch device 16 and a corresponding double-acting fluid cylinder 36 is provided for imparting such movement to the punch holders 24 of the punch devices 14 and 18. As will become apparent, the driving shafts 34a and 36a of the fluid cylinders are suitably connected to the punch devices 14, 16 and 18 so that the punch devices may be rendered operative simultaneously or may be rendered operative in a desired sequence of the punching device 16 and the punching devices 14 and 18. Suitable fluid is supplied to the cylinders 34 and 36 by supply lines, only the supply lines 38a and 38b of the cylinder 34 being shown, which are suitably connected to the opposite ends of the cylinders. For the purpose of this description, the cylinders 34 and 36 will be considered hydraulic cylinders.

In accordance with the present invention, new and improved means are provided for respectively connecting the driving shafts 34a and 36b of the hydraulic cylinders 34 and 36 to the punch device 16 and the punch devices 14 and 18. More specifically, means are provided for allowing the punch devices to be operated simultaneously or in a desired sequence of the device 16 and the devices 14 and 18, the devices 14 and 18 being rendered operative simultaneously with the exemplary arrangement.

In the exemplary arrangement, the driving shaft 36a of the hydraulic cylinder 36 is suitably connected to a tie bar 40, such as by a tongue 42 and connecting block 44 arrangement, and driving guide rods 46a and 46b, which are respectively connected to the punch holders 24 of the punch devices 18 and 14, are connected to opposite ends of the tie bar. Consequently as the hydraulic cylinder 36 functions to drive the tie bar 40 theretoward and thereaway, the punch holders 24 of the punch devices 18 and 14 are respectively driven away from and toward the associated die holders 22 to the respective spaced and punching positions.

Additionally, in the exemplary arrangement, the driving shaft 34a of the hydraulic cylinder 34 is likewise suitably secured to a tie bar 48, such as by a tongue 52 and connecting block 50 arrangement. A driving guide rod 54 and a driving guide plate 56, which are connected to opposite ends of the common punch holder 24′ for the punch device 16, are secured to opposite ends of the tie bar 48. Consequently, as the hydraulic cylinder 34 functions to drive the tie bar 48 theretoward and thereaway, the common punch holder 24′ is respectively driven away from and toward the common die holder 22 to the respective spaced and punching positions. As may best be seen by reference to FIGS. 1 and 3, the driving guide plate 56 is designed to extend over the driving rod 46b associated with the punch device 14. Consequently, the driving means associated with the punch devices 14 and 16 are freely movable in transverse directions without interfering with the operation of each other.

For the purpose of supporting and locating an inverted battery casing or the like so that selected walls thereof are received in punching relationship with the punch devices 14, 16 and 18, upstanding supporting-locating bars 60 and 62 and upstanding locating brackets 64 and 66 are mounted on the support plate 20. The bars 60 and 62 engage the inner bottom wall of a battery casing or the like whereas the brackets 64 and 66 engage side walls thereof. As may be seen, the locating bracket 64 is disposed along the path of the driving guide rod 54 associated with the punch device 16. In order to allow for free movement of the driving guide rod 54 relative to and through the bracket 64, the guide rod 64 is journaled through a ball bushing or the like 68 provided in the base of the bracket 64 (FIG. 3).

For the purpose of providing a better understanding of the present invention, a brief description of the operation of the punch apparatus 10 constructed in accordance with the teachings of the present invention will now be set forth. Initially, a battery casing or the like 12 having walls or partitions as shown in FIG. 4 is invertedly positioned on the apparatus so that the bars 60 and 62 and the brackets 64 and 66 are received therein to support the battery and to locate the battery in a desired position relative to the punch devices 14, 16 and 18. Thereafter, the hydraulic cylinders 34 and 36 are simultaneously or sequentially rendered operative to drive the punch holders 24′ and 24 into punching relationship with the die holders 22′ and 22 so that holes or openings are formed in the walls 12a, 12b and 12c of the battery 12 as shown in FIG. 4. Subsequent to a punching operation, the hydraulic cylinders 34 and 36 are simultaneously or sequentially rendered operative to move the punch holders 24′ and 24 away from the die holders 22′ and 22 and, thus, to extract the associated punches from the openings formed in the battery walls. As previously mentioned, the stripper members 30 function to free the punches from the battery walls. The battery casing 12 may then be removed from the apparatus and another battery casing may be positioned in place for a punching operation.

In view of the foregoing, it will be seen that new and improved piercing punch apparatus has been provided. More specifically, it will be seen that new and improved apparatus of this type has been provided which allows for the formation of openings in transversely disposed walls of battery casings or the like at a single station wherein the openings in transverse directions may be simultaneously or sequentially formed. Moreover, it will be apparent that the apparatus constructed in accordance with the teachings of the present invention may be readily modified to form different size holes by changing the the punches and dies of the punch devices 14, 16 and 18.

What is claimed is:

1. In apparatus for forming openings in transversely disposed walls of a battery casing or the like at a single station, the combination which comprises support means, first means including relatively movable punch shear and die mechanisms positioned on the support means and operable to form openings in walls disposed in a first direction, second means including relatively movable punch shear and die mechanisms positioned on the support means and operable to form openings in walls disposed in a transverse direction, and means to render said first and second means operative including a first driving connection connected to said first means for movement generally parallel to a plane containing the support means and a second driving connection transversely and at least partially disposed in overlapping relation with said first driving connection and connected to said second means for movement generally parallel to a plane containing the support means.

2. In apparatus for forming openings in transversely disposed walls of a battery casing or the like at a single station, the combination which comprises support means, first means positioned on the support means and operable to form openings in walls disposed in a first direction, second means positioned on the support means and operable to form openings in walls disposed in a transverse direction, first actuating means mounted for connection to the first opening forming means and operable to render the first opening forming means operative, second actuating means mounted for connection to the second opening forming means and operable to render the second opening forming means operative, first connecting means for connecting the first actuating means to the first opening forming means, and second connecting means at least partially disposed in overlapping relationship with the first connecting means for connecting the second actuating means to the second opening forming means.

3. In apparatus for forming openings in transversely disposed walls of a battery casing or the like at a single station, the combination which comprises support means, first means positioned on the support means and operable to form openings in walls disposed in a first direction, second means positioned on the support means and operable to form openings in walls disposed in a second direction, and means to render said first and second means operative including a first driving connection connected to said first means for movement generally parallel to a plane containing the support means and a second driving connection transversely and at lesat partially disposed in overlapping relation with said first driving connection and connected to said second means for movement generally parallel to a plane containing the support means, and means for supporting a battery casing or the like in desired positions relative to the opening forming means.

4. In apparatus for forming openings in transversely disposed walls of a battery casing or the like at a single station, the combination which comprises support means, a first plurality of relatively movable punch shear and die mechanisms positioned on the support means and operable to form openings in walls disposed in a first direction, a second plurality of relatively movable punch shear and die mechanisms positioned on the support means and operable to form openings in walls disposed in a transverse direction, and means to render said first and second plurality of relatively movable punch shear and die mechanisms operative including a first driving connection connected to the first plurality of mechanisms for movement generally parallel to a plane containing the support means and a second driving connection transversely and at least partially disposed in overlapping relation with said first driving connection and connected to the second plurality of mechanisms for movement generally parallel to a plane containing the support means.

5. In apparatus for forming openings in transversely disposed walls of a battery casing or the like at a single station, the combination which comprises support means, a first set of relatively movable punch shear and die mechanisms positioned on the support means and operable to form openings in walls disposed in a first direction, a second set of relatively movable punch shear and die mechanisms positioned on the support means and operable to form openings in walls disposed in a transverse direction, first actuating means mounted for connection to the first set of mechanisms and operable to render the first set of mechanisms operative, second actuating means mounted for connection to the second set of mechanisms and operable to render the second set of mechanisms operative, first connecting means for connecting the first actuating means to the first set of mechanisms, second connecting means disposed in at least partially overlapping relationship with the first connecting means for connecting the second actuating means to the second set of mechanisms, and means for supporting a battery casing or the like so that the walls thereof are located in desired positions relative to the mechanisms.

References Cited

UNITED STATES PATENTS

| | | | |
|---|---|---|---|
| 1,452,224 | 4/1923 | Smith | 83—513 X |
| 2,594,506 | 4/1952 | Sharpe | 83—618 X |
| 2,697,264 | 12/1954 | Quenberg | 83—188 X |
| 2,942,059 | 6/1960 | Doyle et al. | |

JAMES M. MEISTER, *Primary Examiner.*

UNITED STATES PATENT OFFICE
CERTIFICATE OF CORRECTION

Patent No. 3,385,151  May 28, 1968

Walter Carl Kirchberger et al.

It is certified that error appears in the above identified patent and that said Letters Patent are hereby corrected as shown below:

Column 1, line 25, "3,328,829" should read -- 3,238,829 --. Column 4, line 69, cancel "the", first occurrence. Column 5, line 43, "lesat" should read -- least --.

Signed and sealed this 2nd day of September 1969.

(SEAL)
Attest:

Edward M. Fletcher, Jr.  WILLIAM E. SCHUYLER, JR.
Attesting Officer  Commissioner of Patents